(12) United States Patent
Riegert et al.

(10) Patent No.: US 8,876,644 B2
(45) Date of Patent: Nov. 4, 2014

(54) PUMP UNIT WITH A PUMP AND A HYBRID DRIVE

(71) Applicant: ZF Friedrichshafen AG, Friedrichshafen (DE)

(72) Inventors: Gernot Riegert, Eriskirch (DE); Raphael Zwick, Kisslegg (DE); Mario Harscher, Bad Wurzach (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 178 days.

(21) Appl. No.: 13/692,198

(22) Filed: Dec. 3, 2012

(65) Prior Publication Data

US 2013/0150199 A1    Jun. 13, 2013

(30) Foreign Application Priority Data

Dec. 9, 2011 (DE) .......................... 10 2011 088 060

(51) Int. Cl.
*F16H 37/06* (2006.01)

(52) U.S. Cl.
USPC ................................ 475/5; 475/151; 417/356

(58) Field of Classification Search
USPC ......................................................... 417/356
See application file for complete search history.

(56) References Cited

U.S. PATENT DOCUMENTS

| | | | |
|---|---|---|---|
| 6,048,179 A * | 4/2000 | Forster | ........................... 417/364 |
| 6,375,436 B1 | 4/2002 | Irie et al. | |
| 6,742,350 B2 | 6/2004 | Suzuki et al. | |
| 6,802,796 B2 | 10/2004 | Asa et al. | |
| 2003/0035742 A1 | 2/2003 | Vukovich et al. | |
| 2003/0059310 A1 | 3/2003 | Koenig et al. | |
| 2005/0169773 A1 | 8/2005 | Schwarz et al. | |

FOREIGN PATENT DOCUMENTS

| | | |
|---|---|---|
| DE | 102 14 637 A1 | 10/2003 |
| DE | 103 29 215 A1 | 1/2005 |
| DE | 10 2004 005 430 A1 | 8/2005 |
| DE | 102006041687 A1 | 3/2008 |
| JP | 2001289315 A | 10/2001 |

OTHER PUBLICATIONS

German Search Report issued in corresponding German Application No. 10 2011 088 060.7 mailed Feb. 27, 2014.

* cited by examiner

*Primary Examiner* — Sherry Estremsky

(74) *Attorney, Agent, or Firm* — Davis & Bujold, PLLC; Michael J. Bujold

(57) ABSTRACT

The pump unit has a pump and a hybrid drive. The pump comprises a pump housing and a pump shaft. The hybrid drive comprises an electric motor and a driveshaft connection to a driveshaft. The electric motor and the driveshaft connection are each in driving mechanical functional connection with the pump shaft by way of a planetary gearset for driving the pump shaft. A stator of the electric motor is at least partially integrated in the pump housing. A rotor of the electric motor is mechanically connected fixed to a sun gear of the planetary gearset. The driveshaft connection is mechanically connected fixed to a ring gear of the planetary gearset. The pump shaft is mechanically connected fixed to a planetary carrier of the planetary gearset.

16 Claims, 1 Drawing Sheet

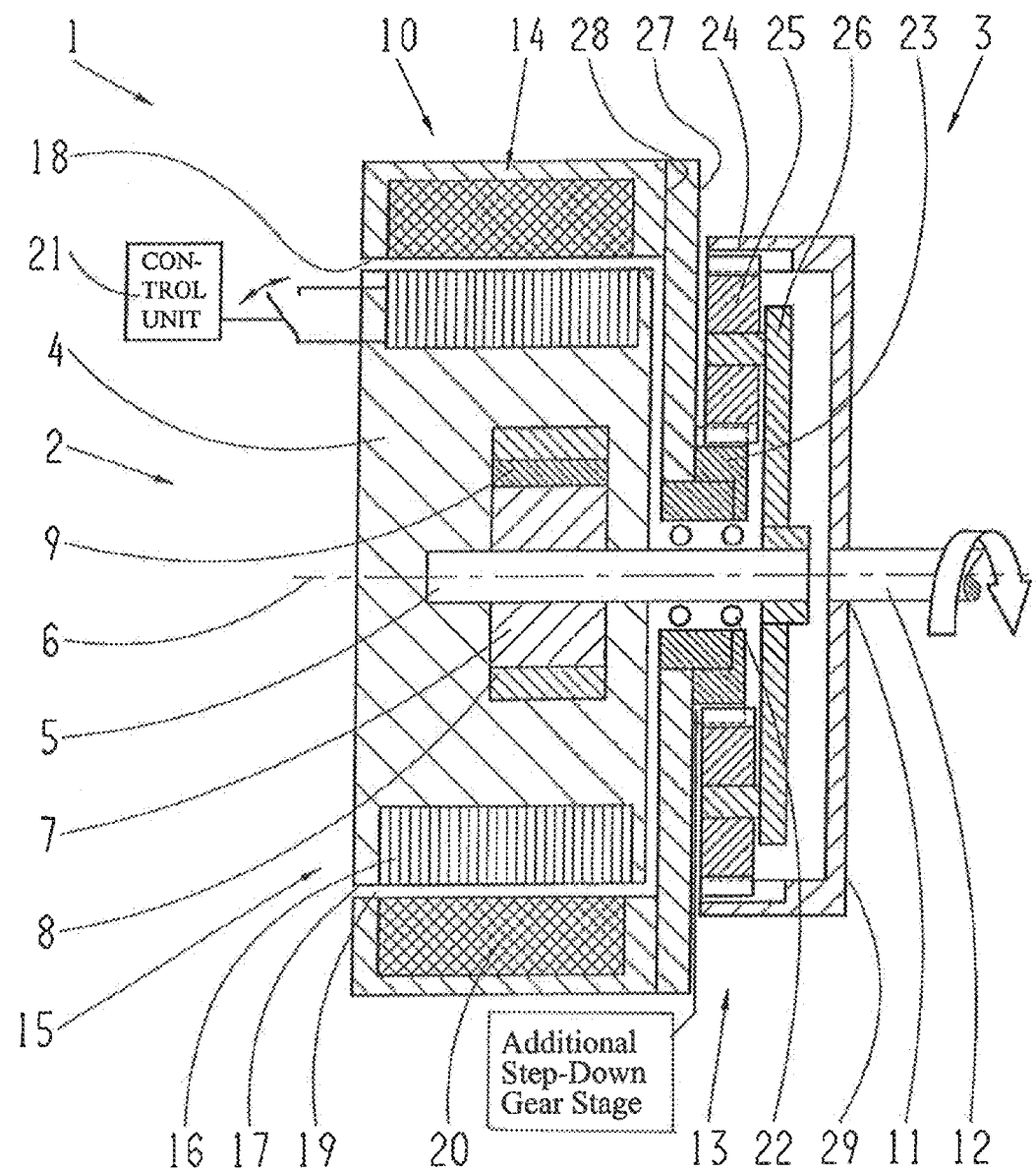

PUMP UNIT WITH A PUMP AND A HYBRID DRIVE

This application claims priority from German patent application serial no. 10 2011 088 060.7 filed Dec. 9, 2011.

FIELD OF THE INVENTION

The invention concerns a pump unit, in particular of a vehicle transmission, with a pump and a hybrid drive, such that the pump comprises a pump housing and a pump shaft and the hybrid drive comprises an electric motor and a driveshaft connection on a driveshaft.

BACKGROUND OF THE INVENTION

Such a pump unit is used for example in an automatic transmission of a motor vehicle for supplying hydraulic oil. In particular, it is driven by the internal combustion engine so that the quantity of hydraulic oil delivered is governed by the running speed of the internal combustion engine. The geometric pump volume is usually designed with regard to the idling speed. Since the volume delivered increases with the running speed, in the upper speed range such a pump often delivers too much oil. On the one hand this leads to unnecessary energy consumption and on the other hand it can result in cavitation problems such as damage and noise emission. Furthermore, a pump driven exclusively by the internal combustion engine of the motor vehicle cannot deliver any oil when the internal combustion engine has stopped, so that elements actuated by oil pressure are then at least no longer fully functional. The internal combustion engine can stop, for example, because of the start-stop operating mode in which, as an environmental protection measure, the internal combustion engine is switched off for a short time depending on the operating situation, or when driving with the internal combustion engine switched off ("coasting"), or when driving under electric power.

In order nevertheless to enable the pump unit to be used in such operating situations, electrically driven pumps are used as well. Compared with pumps driven by an internal combustion engine such electric pumps are less efficient. Moreover, they take up additional structural space.

DE 102 14 637 A1 describes a pump unit with a hybrid drive. Besides the connection to the internal combustion engine, the hybrid drive also comprises an electric motor. Both the internal combustion engine drive and the electric motor drive are used to power the pump by way of a planetary gearset. The hybrid drive is connected upstream from the pump itself, and this also increases the structural space required.

DE 103 29 215 A1 describes a similar pump unit for which there is also provided a hybrid drive with a summation transmission in the form of a planetary gearset for coupling a first power-train, driven by an internal combustion engine and a second power-train driven by an electric motor, to the pump shaft. Once again, the hybrid drive is connected upstream from the pump housing in this example embodiment and increases the space occupied.

DE 10 2004 005 430 A1 describes a further pump unit which, besides the internal combustion engine drive, also comprises an additional electric motor. The rotor of the electric motor is integrated in the pump housing. Correspondingly, the pump housing is mounted so that it can rotate. This increases the cost and effort of production, in particular also for sealing within the pump. Moreover, this solution can only be used with pumps having an internal gearwheel.

SUMMARY OF THE INVENTION

Thus, the purpose of the present invention is to indicate a pump unit of the type mentioned at the start, which provides a supply of the medium to be delivered according to need and which can be produced in a simple and compact manner.

To achieve this objective in this pump unit the electric motor and the driveshaft connection are mechanically functionally connected by way of a planetary gearset to the pump shaft so that each can drive the pump shaft. Furthermore, a stator of the electric motor is at least partially integrated in the pump housing, and a rotor of the electric motor is connected mechanically fixed to a sun gear of the planetary gearset. In addition the driveshaft connection is connected mechanically fixed to a ring gear of the planetary gearset. Moreover, the pump shaft is connected mechanically fixed to a planetary carrier of the planetary gearset.

The pump unit is preferably used in a vehicle transmission, in particular an automatic transmission of a vehicle. For example, the pump unit serves here to produce a hydraulic pressure by which, in a manner known as such, shifting elements can be actuated for changing a gear ratio of the vehicle transmission (engaging gears), and/or by virtue of the hydraulic pressure the vehicle transmission is lubricated and/or cooled in a manner known as such. However, the use of the pump unit is not restricted to those applications, but rather, numerous other fields of application are conceivable. For example it can be used in a stationery hydraulic unit for producing a hydraulic pressure, or otherwise for conveying fluids.

The pump unit can be produced by simple means and at the same time in a very compact form. It is an integrated structure in which in particular the electric motor is at least partially imbedded in the preferably stationary pump housing in a very space-saving manner. Consequently only a little additional space is needed for the electric motor, and the space occupied by the pump unit as a whole is therefore very small.

The planetary gearset is in particular a summation transmission in which, by means of the sun gear and by means of the ring gear drive power can be supplied and by means of the planetary carrier drive power can be transmitted to the pump shaft. In this case the sun gear, the ring gear and the planetary carrier are all in particular mounted so that they can rotate.

By means of the pump unit according to the invention a supply according to need, of the medium (for example oil, coolant or the like) to be delivered is provided without problems. Thus, by way of the driveshaft connection and the driveshaft connected thereto a connection for example to an internal combustion engine, in particular a rotationally fixed connection, can be formed. Thus, the good efficiency of an internal combustion engine drive can be utilized, at least within a certain speed range. Outside that speed range the delivery volume can be adapted dynamically to the requirements at the time by additionally feeding in drive power from the electric motor. In particular, the drive power of the electric motor can be selectively switched on and off, and its extent can be controlled. Furthermore, if needs be the rotational direction of the rotor of the electric motor can be reversed.

Preferably, an additional gear stage that produces a slow ratio, in particular one that consists of a spur gear stage or a chain drive, is positioned in driving connection upstream from the planetary gearset. Thus, this gear stage reduces the rotational speed produced by the driveshaft for driving the planetary gearset. To reduce the structural space needed for the pump unit, the additional gear stage is preferably integrated in the planetary gearset, for example in a ring gear of the planetary gearset, or is arranged immediately next to the planetary gearset. By virtue of this additional gear stage the space requirement of the pump unit, the pump dynamics (build-up time for the pump pressure provided) and cavitation effects in the pump can be further optimized. By converting to low speed, the pump of the pump unit can in particular be designed with a larger geometrical displacement volume, which has dynamic advantages. For example, a larger pump responds more quickly to rotational speed changes. By increasing the displacement volume and at the same time reducing the pump rotational speed, troublesome cavitation phenomena such as pump erosion, noise, etc. can in addition be substantially reduced. On the other hand, high speeds to some extent enable more efficient operation of the electric motor.

Due to the gear ratio of the planetary gearset and that of the additional gear stage, if present, the electric motor can be operated in such units, in particular at high rotational speeds at which its efficiency is better. Such a favorable speed range of the electric motor is for example, between 3000 and 8000 r/min. Furthermore, owing to the torque increase produced by the planetary gearset the electric motor can in particular be made smaller. This too contributes toward reducing the structural space required.

For a practical application with a particularly good relationship between space occupied, efficiency and cavitation properties, which is particularly suitable for use in a vehicle transmission, especially an automatic transmission of a motor vehicle, a planetary gear ratio $i_p$ of $i_p=2$ to $i_p=6$ has been found advantageous. Furthermore it has been found advantageous for the gear ratio $i_0$ of the additional gear stage to be $i_0>1$ to $i_0=2$. The pump of the pump unit is then preferably designed such that it's geometric displacement volume $V_g$ is $V_g=5$ to $V_g=20$ cm$^3$. In this way the speed of the electric motor can be set at the aforesaid, advantageous 3000 to 8000 r/min. With a pump unit so designed, outstanding pump dynamics are achieved along with a substantial reduction of the cavitation effects, and with relatively small structural space occupation.

In a particularly preferred design of the pump unit, in particular for a vehicle transmission and preferably an automatic transmission of a motor vehicle, the gear ratio of the planetary gearset is $i_p=4$ and the ratio of the additional gear stage $i_0=2$. The geometric displacement volume of the pump unit then amounts in particular to around $V_g=20$ cm$^3$. This enables the speed of the electric motor to be set at an efficiency-optimal value of around 6000 r/min. Moreover, cavitation phenomena in the pump are reduced to an extent where they are imperceptible. And in this case the structural space required is also small.

Thus, owing to the partial integration of the electric motor in the pump housing the pump unit according to the invention takes up comparatively little space. It can be operated in a need-orientated manner and above all very efficiently, i.e. with high efficiency, and can be produced by simple means.

A suitable design is one in which magnetic components, in particular permanent magnets of the rotor of the electric motor, are arranged on an inner circumferential surface of a hollow cylindrical rotor component that surrounds the pump housing and in particular is mounted to rotate on a pump shaft. This enables a very compact overall structure to be produced. The rotational movement produced by the electric motor takes place in particular at the hollow cylindrical rotor component, while in contrast the pump housing is more advantageously designed to be stationary. The latter feature avoids the otherwise necessary added complexity and cost of a rotary bearing for the pump housing and of the concomitant, complex sealing inside the pump.

According to a further favorable design, the hollow cylindrical rotor component is provided at its end with a rotor end cover in the center of which the sun gear of the planetary gearset is arranged. This provides a very space-saving, firm mechanical connection between the hollow cylindrical rotor component that can be moved in rotation by electromagnetic forces and the sun gear. Basically, the rotor end cover can be in the form of a disk element covering the whole area, or a braced element in the manner of a wheel with spokes.

In another favorable design, the ring gear of the planetary gearset comprises a hollow cylindrical ring gear component provided at the end with a ring gear end cover at the center of which is arranged the driveshaft connection. This too reduces the structural space needed. The ring gear end cover enables an efficient and simply produced, firm mechanical connection to be made, for example between a driveshaft of an internal combustion engine inserted in a rotationally fixed manner into the driveshaft connection, and the ring gear of the planetary gearset. Moreover, the ring gear end cover too can either be a disk element covering the whole area, or a web element. The additional gear stage, such as a spur gear or chain drive, is preferably interposed as a drive element between the driveshaft connection and the driveshaft. The speed of the driveshaft is stepped down by this.

According to a further favorable design, at its end facing away from the ring gear end cover, the hollow cylindrical ring gear component is adjacent to the rotor end cover, in particular without contact, i.e. without mechanically contacting the rotor end cover directly, since relative rotational movement can occur between the two components. The closely adjacent arrangement of the ring gear component and the rotor end cover again has a favorable effect on the space requirement.

In another favorable design, the hollow cylindrical ring gear component and the ring gear end cover form a housing for the planetary gearset. If this is so, a separate housing can advantageously be omitted, thus reducing the production cost and space requirement.

In another favorable design the electric motor is a synchronous motor. A synchronous motor can be braked particularly simply, since coil windings of a coil system arranged in the stator are short-circuited. When the coil windings in the stator are short-circuited the synchronous motor produces a braking torque, so that the speed of the pump shaft corresponds in particular to the speed of a driveshaft, connected rotationally fixed to the driveshaft connection, modified by the gear ratio of the planetary gearset between the ring gear and the planetary carrier, and less any slip that takes place in the electric motor.

According to a further favorable design, coil windings of the stator of the electric motor can be short-circuited by means of a control unit, the control unit being designed for influencing the speed of the pump shaft without the application of a current. In particular, the control unit controls the application of current to a stator coil system comprising the coil windings. It is also designed in particular to short-circuit the coil windings in order to influence, in particular to reduce the speed of the pump shaft, without applying current to the coil windings. This allows the size of the pump unit to be made such that most operating conditions, i.e. requirements concerning the volume flow to be delivered and/or the pressure existing in the medium to be conveyed, can be covered without applying current to the stator coil windings of the electric motor. This is favorable inasmuch as the overall efficiency of the hybrid unit decreases when (partial) drive power produced by an electric motor is supplied to it. The overall efficiency is considerably higher if the drive power is supplied by way of the driveshaft connection, and there in particular by a driveshaft connected in a rotationally fixed manner, preferably the driveshaft of an internal combustion engine.

In another favorable version the control unit is designed to short-circuit the coil windings in a pulse width modulated manner. This makes it possible to influence, in a particularly need-orientated manner, the time intervals within which the coil windings are short-circuited and within which a braking torque is produced. By virtue of the pulse width modulated short-circuiting of the coil windings, the average duration of the braking torque can be adjusted selectively. In this way the speed of the pump shaft and hence the volume flow delivered by the pump can be influenced, in particular reduced, very simply and preferably continuously at least within a certain speed range. Thus in particular very low pump shaft speeds and small delivery volume flows can be produced—and this, independently of any influencing for example of the internal combustion engine drive power supplied at the driveshaft connection and especially without applying current to the electric motor. A supply appropriate to the needs, of the medium to be delivered, can therefore be produced very simply and with good efficiency (since without energizing the electric motor). This in particular also applies when a fixed-displacement pump is used.

In a further favorable design is a contact pump or a fixed pump. The pump unit is very flexible in its application options. In particular, it does not depend on the use of a particular pump type. Thus for example, a fixed-displacement pump can be procured relatively inexpensively, while in contrast, with a variable-displacement pump the delivery volume can also be adjusted mechanically. Examples of a fixed-displacement pump are a gear pump or a rotary vane pump. Examples of a variable-displacement pump are a pendulum-slider pump or an adjustable rotary vane pump.

According to a further favorable design, the pump is a transmission oil pump, a coolant pump or an engine oil pump. However, those applications are to be understood only as examples. The pump unit can also be used with advantage in applications outside the automotive field. The advantages of high integration leading to small space occupation, simple production and high overall efficiency are obtained in all cases.

The characteristics indicated in the following example embodiments of the pump unit according to the invention are suitable, whether considered alone or in combination with one another, as further developments of the object of the invention. In relation to such further development of the object of the invention, the respective combinations of features are not presented with any restrictive intention, but essentially only as examples.

BRIEF DESCRIPTION OF THE DRAWINGS

Further characteristics, advantages and details of the invention emerge from the following description of example embodiments, given with reference to the drawing. The sole FIGURE shows an example embodiment of a hybrid-driven pump unit, illustrated in longitudinal section in relation to a pump shaft axis.

DETAILED DESCRIPTION OF THE PREFERRED EMBODIMENTS

Particular features of the example embodiments explained in more detail below can also be regarded, in their own right, as an invention or as part of an object of an invention.

The example embodiment of a pump unit 1 shown in the FIGURE is in particular a highly integrated hybrid pump for supplying oil to an automatic transmission of a motor vehicle as needed. The pump unit 1 has as its main components a pump in the form of a hydraulic pump 2 and a hybrid drive 3.

The hydraulic pump 2 has a fixed pump housing 4 in which a pump shaft 5 is mounted to rotate about a rotational axis 6. The pump housing 4 accommodates a pump impeller wheel 7 that can be rotated by means of the pump shaft 5. In addition the hydraulic pump 2 comprises a pump ring gear 8 and a sickle 9. When the pump impeller wheel 7 rotates, oil is fed in an oil volume flow into a duct (not shown) leading it away, from where the oil is passed on into the transmission. The hydraulic pump 2 is a fixed-displacement pump. The oil-conveying components are configured in a manner known as such.

Basically, instead of the hydraulic pump 2 shown in the example embodiment illustrated by the FIGURE, another pump or another pump type, for example a variable-displacement pump, can be used. Likewise, its use for another purpose, for example as a coolant pump or an engine oil pump, is also conceivable.

The hybrid drive 3 comprises an electric motor 10 and a connection 11 for a driveshaft 12 powered by an internal combustion engine (not shown). In addition the hybrid drive 3 has a planetary gearset which mechanically couples the first drive-train powered via the driveshaft 12 by the internal combustion engine and the second drive-train powered by the electric motor 10, to the pump shaft 5.

In drive connection between the driveshaft 12 and the connection 11 it is preferable but not absolutely necessary to arrange a gear stage (not shown here), which steps down the rotational speed of the driveshaft 12 for the planetary gearset 13. This additional gear stage can preferably be integrated in the connection 11 or arranged immediately next to it.

The electric motor 10 has a rotor 14 mounted to be driven in rotation about the rotation axis 6 and a fixed stator 15, the latter formed as an integral constituent of the pump housing 4. The stator 15 comprises a coil system to which current can be applied in order to set the rotor 14 into rotary motion. The coil system consists of a number of stator windings 16 imbedded on an outer circumferential surface 17 of the pump housing 4 in corresponding recesses (not shown) in the pump housing 4. The rotor 14 is designed as a hollow cylindrical component that surrounds the pump housing 4 and is arranged with an inner circumferential surface 18 close to the outer circumferential surface 17 of the pump housing 4. An air gap 19 is provided between the outer circumferential surface 17 and the inner circumferential surface 18. On the inner circumferential surface 18 of the rotor 14 are fixed permanent magnets 20.

In the example embodiment shown, the electric motor 10 is a synchronous motor. The current supplied to the stator windings 16 can be adjusted by a control unit 21. In addition the control unit 21 is connected to the coil system of the stator 15 in such manner that the stator windings 16 can be short-circuited if necessary. In other words the control unit 21 is designed so as to enable the switch manipulations required for short-circuiting the stator windings 16. In particular, the control unit 21 can also enable a pulse width modulated short-circuiting of the stator windings 16.

The planetary gearset 13 comprises a sun gear 23 mounted to rotate via a bearing 22 on the pump shaft 5, a ring gear 24, and a planetary carrier 26 provided with planetary gears 25. The sun gear 23 is connected fixed to a rotor end cover 27. In particular, the sun gear 23 extends with a corresponding extension-piece into a matching central recess in the rotor end cover 27, which is positioned concentrically relative to the rotational axis 6, so that a rotationally fixed connection is formed between the sun gear 23 and the rotor end cover 27. In its radial edge area the rotor end cover 27 is attached mechanically fast to an axial end wall 28 of the hollow cylindrical component of the rotor 14, so that overall a mechanically fixed connection is formed between the rotor 14 and the sun gear 23. For this, the hollow cylindrical part of the rotor 14, the rotor end cover 27 and the sun gear 23 can each be made as separate components. Alternatively, an integral structure of all three components, or at least of two of the three components, can be provided.

With its outer teeth the sun gear 23 is in meshing functional connection with the corresponding outer teeth of the planetary gears 25 mounted to rotate on the planetary carrier 26. In addition, with their outer teeth the planetary gears 25 are in meshing functional connection with inner teeth provided on an inner circumferential surface of the ring gear 24. The planetary carrier 26 is mounted in a rotationally fixed manner on the pump shaft 5. Besides the actual hollow cylindrical component itself, the ring gear 24 comprises a ring gear end cover 29 in the center of which the connection 11 is arranged and which is connected rotationally fixed to the driveshaft 12. The driveshaft 12 is mounted to rotate about the rotation axis 6, but the pump shaft 5 and the driveshaft 12 are not connected directly. The two shafts 5 and 12 can rotate at different speeds. The hollow cylindrical part of the ring gear 24 and the ring gear end cover 29 can again be made as two separate components mechanically connected fast to one another, or as an integral component.

The planetary gearset 13 can be driven by two gears (separately or together), namely the sun gear 23 and the ring gear 24. The drive output takes place by way of one component, namely the planetary carrier 26 connected fixed to the pump shaft 5.

Accordingly, with the hybrid drive 3 a drive power provided by the internal combustion engine via the driveshaft 12 and the connection 11 can be combined, very largely in any desired combination, with a drive power produced by the electric motor 10, and coupled to the pump shaft 5. Thus, the hybrid drive 3 makes available two drive sources whose contributing fractions toward driving the pump shaft 5 can be adjusted according to need and with a view to the best possible overall efficiency in each case.

Thanks to the imbedding of the stator 15 in the pump housing 4, the pump unit 1 occupies exceptionally little structural volume. Advantageously, the ring gear 24 together with the ring gear end cover 29 serve as the housing for the planetary gearset 13, which also keeps the space requirement small.

In the example embodiment shown the electric motor 10 is designed as a synchronous motor, so that short-circuiting the stator windings 16 produces a braking torque. Within certain limits the size of the time-averaged braking torque can be adjusted by the pulse width controlled modulation of the short-circuiting. This allows the speed of the pump shaft to be influenced without having to apply current to the stator coil system.

Thus, overall the pump unit 1 is a very compact assembly which can at the same time be produced by simple means, despite which it enables very efficient and above all requirement-orientated oil delivery. Furthermore, the necessary oil volume flow can also be provided reliably even if the driveshaft 12 has stopped or is rotating at too low a speed, since then the (additional) drive power required can in any case be delivered by the electric motor 10.

INDEXES

1 Pump unit
2 Hydraulic pump
3 Hybrid drive
4 Pump housing
5 Pump shaft
6 Rotation axis
7 Pump impeller wheel
8 Pump ring gear
9 Sickle
10 Electric motor
11 Connection
12 Driveshaft
13 Planetary gearset
14 Rotor
15 Stator
16 Stator windings
17 Outer circumferential surface of the pump housing
18 Inner circumferential surface of the hollow-cylindrical rotor component
19 Air gap
20 Permanent magnets
21 Control unit
22 Bearing
23 Sun gear
24 Ring gear
25 Planetary carrier
26 Planetary carrier
27 Rotor end face cover
28 Axial end wall
29 Ring gear end cover

The invention claimed is:

1. A pump unit with a pump (2) and with a hybrid drive (3); the pump comprising a pump housing (4) and a pump shaft (5), and the hybrid drive (3) comprising an electric motor (10) and a driveshaft connection (11) to a driveshaft (12);
the electric motor (10) and the driveshaft connection (11) are each in driving mechanical functional connection with the pump shaft (5), by way of a planetary gearset (13), for driving the pump shaft (5);
a stator (15) of the electric motor (10) being at least partially integrated in the pump housing (4) and a rotor (14) of the electric motor (10) being mechanically fixedly connected to a sun gear (23) of the planetary gearset (13);
the driveshaft connection (11) being mechanically fixedly connected to a ring gear (24) of the planetary gearset (13); and
the pump shaft (5) being mechanically fixedly connected to a planetary carrier (25) of the planetary gearset (13).

2. The pump unit according to claim 1, wherein magnetic components (20) of the rotor (14) of the electric motor (10) are arranged on an inner circumferential surface (18) of a hollow cylindrical rotor component that surrounds the pump housing (4).

3. The pump unit according to claim 2, wherein the hollow cylindrical rotor component is provided with a rotor end cover (27) and the sun gear (23), of the planetary gearset (13), is arranged at a center of a rotor end cover (27).

4. The pump unit according to claim 3, wherein a hollow cylindrical ring gear component is adjacent to the rotor end cover (27) at an end of the hollow cylindrical ring gear component facing away from a ring gear end cover (29).

5. The pump unit according to claim 1, wherein the ring gear (24) of the planetary gearset (13) comprises a hollow cylindrical ring gear component provided with a ring gear end cover (29), at its end, and the driveshaft connection (11) is arranged at a center of the ring gear end cover (29).

6. The pump unit according to claim 5, wherein the hollow cylindrical ring gear component and the ring gear end cover (29) form a housing for the planetary gearset (13).

7. The pump unit according to claim 1, wherein coil windings (16) of the stator (15) of the electric motor (10) are short-circuited by a control unit (21), and the control unit (21) is designed to enable a speed of the pump shaft (5) to be influenced without an application of a current.

8. The pump unit according to claim 7, wherein the control unit (21) is designed to short-circuit the stator windings (16) in a pulse width modulated manner.

9. The pump unit according to claim 1, wherein the pump (2) is either a fixed-displacement pump or a variable-displacement pump.

10. The pump unit according to claim 1, wherein an additional, step-down gear stage is in driving connection upstream of the planetary gearset (13).

11. The pump unit according to claim 10, wherein
the planetary gearset (13) has a gear ratio $i_p$ of $i_p=2$ to $i_p=6$,
the additional step-down gear stage has a gear ratio of $i_0>1$ to $i_0=2$, and
the pump (2) has a geometrical displacement volume of $V_g=5$ to $V_g=20$ cm$^3$.

12. A pump unit for a vehicle transmission, the pump unit comprising:
a hydraulic pump having a fixed pump housing and a pump shaft being rotatably supported by the pump housing such that the pump shaft rotates about a rotational axis with respect to the pump housing to facilitate pumping hydraulic fluid;
a hybrid drive comprising an electric motor and a driveshaft connection being continuously connected to a driveshaft such that the driveshaft connection and the driveshaft rotate in unison about the rotational axis, the driveshaft being rotationally driven by an internal combustion engine;
the electric motor comprises a plurality of stator windings and a cylindrical rotor, the plurality of stator windings being fixed in the pump housing about an outer circumference thereof, the rotor having magnets that are fixed within the rotor, the rotor radially surroundings the pump housing such that the stator windings being aligned with magnets, an electrical control unit being connected to the stator windings to control electrical current directed to the stator windings so as to control rotational drive of the rotor; and
a planetary gearset drivingly couples the rotor of the electric motor and the driveshaft, a sun gear of the planetary gearset being continuously connected to the rotor of the electric motor, a ring gear of the planetary gearset being continuously connected to the driveshaft connection and a planetary carrier being continuously connected to the pump shaft of the hydraulic pump, the planetary carrier rotatably supports planet gears which engage the sun gear and the ring gear such that the rotational drive from the electric motor and rotational drive from the driveshaft combine and rotationally drive the pumpshaft of the hydraulic pump.

13. The pump unit according to claim 12, wherein the stator windings of the electric motor are short-circuited by the control unit, and the control unit facilitates rotational drive of the pump shaft to be influenced without an electrical current.

14. The pump unit according to claim 13, wherein the control unit short-circuits the stator windings in a pulse width modulated manner.

15. The pump unit according to claim 12, wherein the pump is either a fixed-displacement pump or a variable-displacement pump.

16. The pump unit according to claim 12, wherein the planetary gearset has a gear ratio that is within a gear ratio range of between 2 to 6 and the hydraulic pump has a geometrical displacement volume of between 5 to 20 cm$^3$.

* * * * *